US005761718A

United States Patent [19]
Lin et al.

[11] Patent Number: 5,761,718
[45] Date of Patent: Jun. 2, 1998

[54] CONDITIONAL DATA PRE-FETCHING IN A DEVICE CONTROLLER

[75] Inventors: Yung Cheng Lin, Kaohsiung; Shih Jen Chuang, Taipei, both of Taiwan

[73] Assignee: Silicon Integrated Systems Corp., Hsinchu, Taiwan

[21] Appl. No.: 705,738

[22] Filed: Aug. 30, 1996

[51] Int. Cl.$^6$ ............................................. G06F 12/08
[52] U.S. Cl. ............................ 711/137; 711/213; 395/383
[58] Field of Search ............................. 711/137, 113, 711/117, 118, 213, 217, 218, 219; 395/383

[56] References Cited

U.S. PATENT DOCUMENTS 5,586,294  12/1996  Goodwin et al. .................. 711/137

Primary Examiner—Eddie P. Chan
Assistant Examiner—Hiep T. Nguyen

[57] ABSTRACT

An algorithm for conditionally pre-fetching data for DRAM access is disclosed. A similar pattern of performing successive block reads of DRAM data in the execution of several types of instructions in a computer system is determined by analyzing CPU signals. These instructions repeatedly read blocks of data from a local memory area. Additional writes to memory or an input/output port may intervene between the repeated block reads. By using the pattern as a condition for pre-fetching data from DRAM into a high speed memory buffer of a memory controller, consecutive memory reads can be completed with zero wait state. The penalty incurred by unconditional pre-fetching of DRAM data is minimized. The conditional pre-fetching mechanism is applicable to other computer peripheral devices.

10 Claims, 1 Drawing Sheet

CONDITIONAL DATA PRE-FETCHING IN A DEVICE CONTROLLER

FIELD OF THE INVENTION

The present invention relates to a mechanism of peripheral device data in a computer system, more specifically to a pre-fetching algorithm used in a device controller for accessing the device data in a computer system.

BACKGROUND OF THE INVENTION

As the CPU of a modern computer system becomes more and more powerful, the performance of a computer system depends greatly on the speed of its peripheral devices. The access of dynamic random access memory (DRAM) is a good example. Due to the popularity of the window based user interface, most modern application software packages require a large amount of memory in the computer system. Many of the Pentium-based computer systems are loaded with more than 16M bytes of DRAMs. When the application software is running in the system, memory access time represents a significant portion of the program execution time. Therefore, reducing the time in accessing DRAM is important in improving the efficiency for a computer system.

In the conventional scheme of accessing DRAM device, during a memory access cycle, the memory controller receives the memory address to be accessed from the memory bus owner and translates the address to locate the memory device where the data will be read from or written to. The computer system often spends a lot of time in waiting to access the DRAM data because of the limitation in the speed of DRAM. Therefore, there is a strong need in designing an efficient memory access scheme for reducing the idle time to improve the performance of the computer system.

One way to improve the speed of DRAM access is to provide a mechanism for pre-fetching memory data and storing them in a high speed buffer such as a first-in-first-out (FIFO) register or a static random access memory device. The memory data for the following memory cycle can then be accessed from the temporary buffer if the desired memory data have been pre-fetched in the high speed buffer. The access time can be greatly reduced. The pre-fetching idea can also be applied to other device controller to increase the efficiency of a computer system.

The conventional mechanism of pre-fetching, however, has a drawback in that the pre-fetching of data is implemented blindly without considering the flow of an application program. As an example, the pre-fetching mechanism will allow the system to access memory data with almost no wait state if consecutive memory data are requested in the successive memory reads by the CPU. In general, the program may not access data in a local memory area continually and regularly. The unconditional pre-fetching mechanism often imposes significant penalty to the performance of a computer system.

SUMMARY OF THE INVENTION

The present invention has been made to overcome the above-mentioned drawback of a conventional pre-fetching mechanism in a device controller. The primary object of this invention is to provide an algorithm for pre-fetching DRAM data selectively according to the condition of the program flow in order to benefit from the pre-fetching of memory data effectively without imposing penalty. Another object of the invention is to present a conditional data pre-fetching algorithm for other peripheral device controllers in order to improve the overall computer performance.

According to the present invention, several instructions executed in the modern CPU have been found to perform repeated reads to get blocks of data from a local memory area. By examining the behavior of the available CPU signals, one can predict that blocks of data in a local memory area will be accessed repeatedly. Under the right condition, the algorithm of this invention pre-fetches a block of memory data to a high speed buffer. The memory data can therefore be efficiently accessed in the following successive memory read. The conditional data pre-fetching is also applicable to other controller device. The pre-fetching mechanism of the invention is selective as well as conditional and the penalty of unconditional pre-fetching is minimized.

DETAILED DESCRIPTION OF THE PREFERRED EMBODIMENTS

Figure 1:
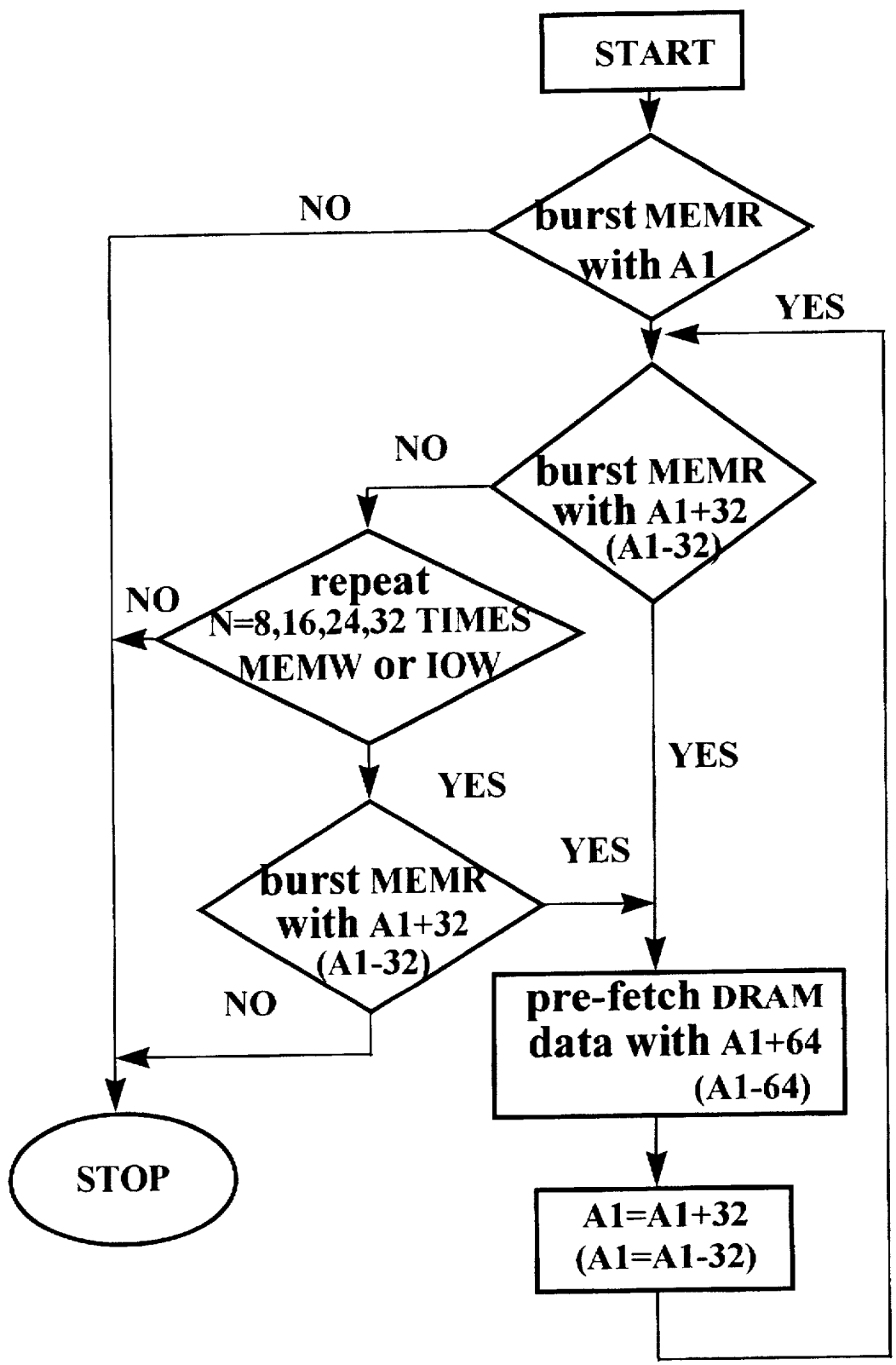
FIG. 1 shows the flow diagram of the algorithm of this invention for pre-fetching DRAM data in a computer system.

The data pre-fetching mechanism of the present invention can be applied generally to many peripheral devices that are frequently accessed by the CPU of a computer system with successive block reads. The disclosure will use the pre-fetching of data from a DRAM device as an example to explain the principle and advantage of the invention.

In today's software application, a program usually includes rich graphical user interface and MPEG-2 application that require intensive access of DRAM data. The computer frequently performs successive memory reads in consecutive cycles while the program is running. As discussed in the background of the invention, the pre-fetching of DRAM data will allow the system to access memory data with almost no wait state if consecutive memory data are requested in the successive memory reads by the CPU.

Because the program instructions are decoded inside the CPU by an instruction decoder, it is not possible to know if the instructions will perform successive memory read or not. Nevertheless, there are signals sent out from the CPU for accessing data and interfacing with supporting circuit while an instruction is executed. For example, in an X86 architecture CPU, typical signals that are available include ADS_, $W_{13}$ R, D_C, M_IO. ADS_ indicates the beginning of a CPU external cycle. W_R signals a write or read function. D_C stands for data or code. M_IO represents a memory access or an input/output (IO) function. Therefore, it is possible to figure out from these signals if the CPU is performing a memory read (MEMR), a memory write (MEMW) or an input/output write (IOW).

In general, a cache line in the computer contains 32 bytes of data, modern CPU frequently performs a burst MEMR to get 32 bytes of data. By analyzing the signals such as ADS_, W_R, D_C and M_IO, a person skilled in the field can design a mechanism to determine if the CPU is performing a burst MEMR, a MEMW or an IOW. The detail of designing the mechanism is not an object of this invention and will not be described in this disclosure.

By examining the behavior of the CPU according to the above signals and the operations of the CPU, it has been found that several instructions of a CPU with a X86 or Pentium architecture CPU have a similar execution pattern that reads blocks of data repeatedly from the DRAM. The actions of the instructions including REP MOVS, REP SCANS, REP LODS, and REP OUTS have been analyzed and will be described in the following to show the similar pattern.

---

1. REP MOVS:
   if MEMW hit L1 cache then
       burst MEMR with address A1
       burst MEMR with address A1+32 (or A1−32)
       burst MEMR with address A1+64 (or A1−64)
       . . . (other actions)
   else
       burst MEMR with address A1
       Repeat MEMW N times
       burst MEMR with address A1+32 (or A1−32)
       Repeat MEMW N times
       burst MEMR with address A1+64 (or A1−64)
       . . . (other actions)
2. REP SCANS:
   burst MEMR with address A1
   burst MEMR with address A1+32 (or A1−32)
   burst MEMR with address A1+64 (or A1−64)
   . . . (other actions)
3. REP LODS:
   burst MEMR with address A1
   burst MEMR with address A1+32 (or A1−32)
   burst MEMR with address A1+64 (or A1−64)
   . . . (other actions)
4. REP OUTS
   burst MEMR with address A1
   Repeat IOW N times
   burst MEMR with address A1+32 (or A1−32)
   Repeat IOW N times
   burst MEMR with address A1+64 (or A1−64)
   . . . (other actions)

---

Because a cache line contains 32 bytes of data, it can be seen that these instructions repeatedly perform a burst read (burst MEMR with address A1) to get a cache line followed by 0 or N times of MEMW or IOW. The number N depends on the type of REP MOVS or REP OUTS. If it is a double word REP MOVS, N is equal to 8. If it is a single word REP MOVS, N can be equal to 16 or 24. For a byte REP MOVS, N is equal to 32. L1 cache is a cache commonly used in the x86 architecture computer. Similarly, if it is a double word REP OUTS, N is equal to 8. If it is a single word REP OUTS, N should be equal to 16 or 24. For a byte REP OUTS, N is equal to 32. In addition, dependent on either the data have to be accessed in the forward direction or backward direction, the memory address of the next burst read is the memory address of the current burst read increased or decreased by 32.

As discussed above, many instructions have a similar behavior of repeatedly performing a burst read followed either 0, 8, 16, 24, or 32 times of memory or IO writes. In principle, if the memory data of the next burst read can be pre-fetched into a high speed buffer in the DRAM controller, the consecutive memory data requested in the next burst read can be accessed with zero wait state. In order to effectively achieve the benefit of pre-fetching memory data, this invention checks the above condition before the pre-fetching is performed.

FIG. 1 shows a flow diagram of this invention for conditionally pre-fetching DRAM data into a high speed memory buffer. In summary, the procedure of this invention for determining if pre-fetching should be performed in the DRAM controller is as follows:

a. Check if the current operation is a burst MEMR with a memory address A1. If the condition is not true, the algorithm ends without pre-fetching DRAM data.

b. Check if the next operation is another burst MEMR with a memory address A1+32 (or A1−32). If the condition is true, go to step e.

c. If the condition in step b is not satisfied, determine if N MEMW or IOW operations are repeated, where N is 8, 16, 24, or 32. If the condition is not satisfied, the algorithm ends without pre-fetching DRAM data.

d. Check if the following operation is a burst MEMR with a memory address A1+32 (or A1−32). If the condition is not satisfied, the algorithm ends without pre-fetching DRAM data.

e. Pre-fetch and store the memory data from DRAM with a memory address A1+64 (or A1−64).

f. Increase (or decrease) the address A1 by 32 and return to step b.

According to the procedure described above, the invention provides a selective mechanism for data pre-fetching to ensure that successive memory reads can be completed without wait states to achieve maximum system performance. Although the above description uses DRAM device as an example, the algorithm can also be applied to peripheral devices in a computer system such as an L2 cache or other PCI bus devices.

What is claimed is:

1. A method for conditional pre-fetching data from dynamic random access memory in a computer system including a CPU and a memory controller having a cache size and an address offset, comprising the steps of:

a) examining and checking a current action executed in said CPU;

b) terminating the pre-fetch operation without pre-fetching data if said current action in step (a) is not a burst memory read at a first memory address;

c) examining and checking the next succeeding action executed in said CPU;

d) executing step (i) if said next succeeding action in step (c) is a burst memory read at a memory address formed by adding said address offset to said first address;

e) executing step (g) if said next succeeding action in step (c) comprises a number of successive memory writes or successive IO writes, said number being multiple of 8 but not greater than said cache size;

f) terminating the pre-fetch operation without pre-fetching data;

g) examining and checking the next succeeding action executed in said CPU;

h) terminating the pre-fetch operation without pre-fetching data if said next succeeding action in step (g) is not a burst memory read at a memory address formed by adding said address offset to said first address;

i) pre-fetching a plurality of bytes of data to a temporary memory buffer in said memory controller from said dynamic random access memory at a memory address formed by adding twice of said address offset to said first address, the size of said plurality of bytes being equal to said cache size;

j) updating said first memory address with an increment equal to said address offset and returning to step (c);

wherein said address offset is a positive number equal to said cache size.

2. The method for conditionally pre-fetching data from dynamic random access memory in a computer system according to claim 1, wherein said cache size is 32.

3. The method for conditionally pre-fetching data from dynamic random access memory in a computer system according to claim 1, wherein said address offset is a negative number having an absolute value equal to said cache size.

4. The method for conditionally pre-fetching data from dynamic random access memory in a computer system according to claim 3, wherein said cache size is 32.

5. A method for conditionally pre-fetching data from a peripheral device in a computer system including a CPU and a device controller having a cache size and an address offset, comprising the steps of:

a) examining and checking a current action executed in said CPU;

b) terminating the pre-fetch operation without pre-fetching data if said current action in step (a) is not a burst read of said device at a first address;

c) examining and checking the next succeeding action executed in said CPU;

d) executing step (i) if said next succeeding action in step (c) is a burst read of said device at an address formed by adding said address offset to said first address;

e) executing step (g) if said next succeeding action in step (c) comprises a number of successive writes to said device or an input/output device, said number being multiple of 8 but not greater than said cache size;

f) terminating the pre-fetch operation without pre-fetching data;

g) examining and checking the next succeeding action executed in said CPU;

h) terminating the pre-fetch operation without pre-fetching data if said next succeeding action in step (g) is not a burst read of said device at an address formed by adding said address offset to said first address;

i) pre-fetching a plurality of bytes of data to a temporary memory buffer in said device controller from said peripheral device at an address formed by adding twice of said address offset to said first address, the size of said plurality of bytes being equal to said cache size;

j) updating said first address with an increment equal to said address offset and returning to step (c);

wherein said address offset is a positive number equal to said cache size.

6. The method for conditionally pre-fetching data from a peripheral device in a computer system according to claim 5, wherein said peripheral device is an L2 cache.

7. The method for conditionally pre-fetching data from a peripheral device in a computer system according to claim 5, wherein said peripheral device is a PCI bus device.

8. The method for conditionally pre-fetching data from a peripheral device in a computer system according to claim 5, wherein said cache size is 32.

9. The method for conditionally pre-fetching data from a peripheral device in a computer system according to claim 5, wherein said address offset is a negative number having an absolute value equal to said cache size.

10. The method for conditionally pre-fetching data from a peripheral device in a computer system according to claim 9, wherein said cache size is 32.

* * * * *